United States Patent
Palanivel et al.

(10) Patent No.: US 11,402,813 B2
(45) Date of Patent: Aug. 2, 2022

(54) WALL MOUNTABLE UNIVERSAL BACKPLANE

(71) Applicant: Honeywell International Inc., Morris Plains, NJ (US)

(72) Inventors: Rajkumar Palanivel, Eden Prairie, MN (US); Himanshu Khurana, Excelsior, MN (US); Amit Kulkarni, Medina, MN (US); Rongbao Nie, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 390 days.

(21) Appl. No.: 16/734,837

(22) Filed: Jan. 6, 2020

(65) Prior Publication Data
US 2021/0208555 A1 Jul. 8, 2021

(51) Int. Cl.
G05B 19/042 (2006.01)
H04L 67/12 (2022.01)
G05B 15/02 (2006.01)
G05B 19/04 (2006.01)
G16Y 10/80 (2020.01)
H04W 84/18 (2009.01)

(52) U.S. Cl.
CPC .. G05B 19/042 (2013.01); *G05B 2219/25011* (2013.01); *G16Y 10/80* (2020.01); *H04L 67/12* (2013.01); *H04W 84/18* (2013.01)

(58) Field of Classification Search
CPC ........ G05B 19/042; G05B 2219/25011; G05B 2219/2642; G05B 15/02; G05B 19/0428; G16Y 10/80; H04L 67/12; H04W 84/18
USPC .......................................................... 700/275
See application file for complete search history.

(56) References Cited

U.S. PATENT DOCUMENTS

| | | | |
|---|---|---|---|
| 8,014,970 | B2 | 9/2011 | Gulati et al. |
| 9,538,578 | B1 | 1/2017 | Stamatakis et al. |
| 9,729,341 | B2 | 8/2017 | Kaps et al. |
| 10,171,891 | B1 | 1/2019 | Stamatakis |

(Continued)

OTHER PUBLICATIONS

Extended European Search Report, EP Application No. 20217467.8-1205, dated May 28, 2021 (6 pages).

*Primary Examiner* — Michael J Brown
(74) *Attorney, Agent, or Firm* — Seager, Tufte & Wickhem, LLP (57) ABSTRACT

Methods and system for adding sensors/devices to a building management system. An illustrative universal backplane for accepting a plurality of building control sensors may include a housing configured to be secured relative to a wall of a building and a plurality of universal sensor receiving bays each including the same mechanical and electrical interface for selectively receiving one of a plurality of compatible building control sensors. Each of the plurality of compatible building control sensors may be compatible with the mechanical and electrical interface of the universal sensor receiving bays. The backplane may further include a controller operatively coupled to each of the plurality of universal sensor receiving bays, the controller configured to automatically discover each of the compatible building control sensors, if any, received by the plurality of universal sensor receiving bays and a communication module operatively coupled to the controller for communicating with a building control system.

20 Claims, 7 Drawing Sheets

(56) References Cited

U.S. PATENT DOCUMENTS

| | | | |
|---|---|---|---|
| 2008/0027587 A1* | 1/2008 | Nickerson | G05D 7/0617 |
| | | | 700/284 |
| 2013/0007316 A1 | 1/2013 | Moon et al. | |
| 2014/0303782 A1* | 10/2014 | Pruchniewski | H04L 61/2038 |
| | | | 709/204 |
| 2018/0292098 A1* | 10/2018 | Bandyopadhyay | F24F 11/62 |

* cited by examiner

WALL MOUNTABLE UNIVERSAL BACKPLANE

TECHNICAL FIELD

The disclosure generally relates to building management systems, and more particularly to systems and methods for a standard backplane to which sensors and edge devices can be added to a building management system.

BACKGROUND

Adding new capabilities, such as but not limited to adding a new sensor, a new edge device and/or other capability to a building management system (BMS), often requires a service call from an professional technician to install, configure and commission the new device(s). What would be desirable is an easier way for a do-it-yourselfer to add devices to a BMS.

SUMMARY

This disclosure generally relates to building management systems, and more particularly to a standard backplane to which sensors, edge and/or other devices can be easily added and connected to a building management system.

In one example, a wall mountable universal backplane may include a housing configured to be secured relative to a wall of a building and a plurality of universal sensor receiving bays each including the same mechanical and electrical interface for selectively receiving one of a plurality of compatible building control sensors/devices. Each of the plurality of compatible building control sensors/devices may include a mechanical and electrical interface that is compatible with the mechanical and electrical interface of the universal sensor receiving bays. The wall mountable universal backplane may further include a controller operatively coupled to the electrical interface of each of the plurality of universal sensor receiving bays, the controller configured to automatically discover each of the compatible building control sensors, if any, received by the plurality of universal sensor receiving bays, and a communication module operatively coupled to the controller for communicating with a building control system. The building control system may be a building management system.

In some cases, automatically discovering each of the compatible building control sensors that are received by the plurality of universal sensor receiving bays may include automatically identifying one or more functions of each of the compatible building control sensors that are received by the plurality of universal sensor receiving bays.

In some cases, automatically identifying one or more functions provided by the compatible building control sensors that are received by the plurality of universal sensor receiving bays may include the controller receiving one or more Function IDs from each of the compatible building control sensors that define the one or more functions of the corresponding compatible building control sensor.

In some cases, automatically discovering each of the compatible building control sensors that are received by the plurality of universal sensor receiving bays may include the controller receiving a Device ID from each of the compatible building control sensors that are received by the plurality of universal sensor receiving bays.

In some cases, automatically discovering each of the compatible building control sensors that are received by the plurality of universal sensor receiving bays may further include the controller assigning a local address to each of the compatible building control sensors and communicating the local address to the corresponding compatible building control sensor.

In some cases, automatically discovering each of the compatible building control sensors that are received by the plurality of universal sensor receiving bays may further include the controller registering each of the compatible building control sensors with the building control system, including identifying one or more functions of each of the compatible building control sensors to the building control system.

In some cases, the communication module may include a wireless network interface. In some cases, the communication module may be configured to form a node in a wireless mesh network. In some cases, the communication module may include a wired network interface. In some cases, the communication module may be configured to communicate with one or more other wall mountable universal backplanes.

In some cases, the controller may be configured to process data received from one or more of the compatible building control sensors that are received by the plurality of universal sensor receiving bays, and transmit a result to a remote device. In some cases, the remote device may include one or more of another wall mountable universal backplane and/or the building control system.

In some cases, the controller may be configured to transmit one or more control commands to one or more building control devices of the building control system in response to a sensor reading from one of the compatible building control sensors crossing a predetermined threshold.

In some cases, the controller may be configured to provide a location identifier to the building control system, wherein the location identifier identifies a physical location of the wall mountable universal backplane within the building.

In some cases, the controller may be configured to determine and transmit a recommendation to a remote device for the addition of a particular compatible building control sensor to one of the plurality of universal sensor receiving bays.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

Adding new capabilities, such as, but not limited to sensors and/or devices, and/or enhancing the capabilities of a building control system may require professional re-engineering, configuration, and/or commissioning. Currently methods of adding a new sensor or a device to an existing building management system may require a lot of effort and re-engineering in the control panels and a complete redesign of the consumption software layer. What may be desirable is a system that allows a building owner, supervisor, etc. to install new sensors or devices into an existing building management system without requiring a service call by a professional technician. The disclosure generally relates to a wall mountable universal backplane for accepting a plurality of building control sensors without significant effort, re-engineering of the control panel, or software redesigns.

Figure 1:
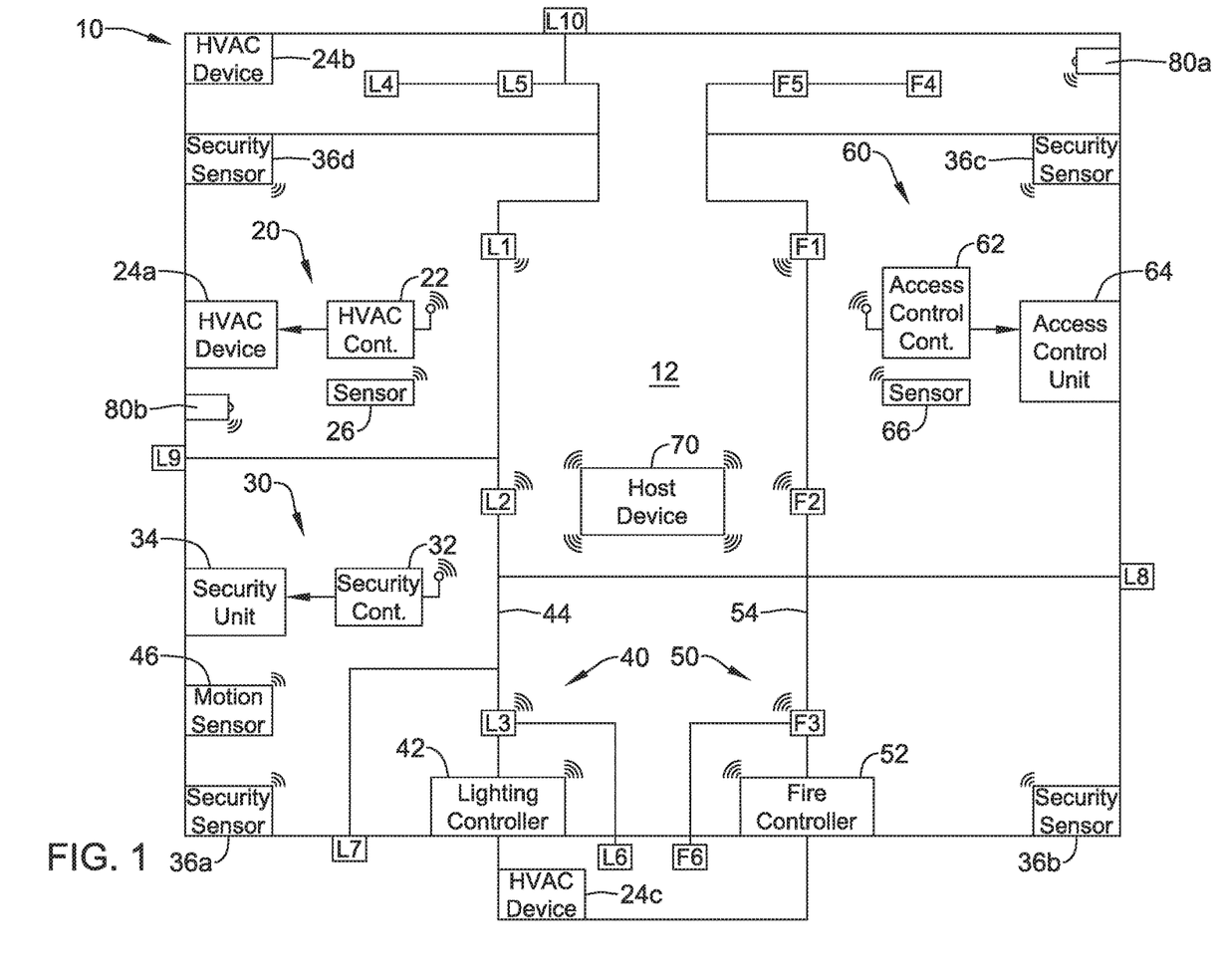
FIG. 1 is a schematic view of an illustrative building or other structure that includes a building control system that controls client devices servicing the building.

FIG. 1 is a schematic view of an illustrative building or structure 10 that includes an illustrative building control system 12 for controlling one or more client devices servicing the building or structure 10. The building control system 12, as described herein according to the various illustrative embodiments, may be used to control the one or more client devices in order to control and/or monitor certain conditions (e.g., temperature, ventilation, humidity, lighting, security, access, etc.). Such a building control system 12 may be implemented in, for example, office buildings, factories, manufacturing facilities, distribution facilities, retail buildings, hospitals, health clubs, movie theaters, restaurants, and even residential homes.

The illustrative building control system 12 shown in FIG. 1 includes one or more heating, ventilation, and air conditioning (HVAC) systems 20, one or more security systems 30, one or more lighting systems 40, one or more fire systems 50, and one or more access control systems 60. These are just a few examples of systems that may be included or controlled by the building control system 12, sometimes known as a building management system. In some cases, the building control system 12 may include more or fewer systems depending on the application. For example, some buildings may include refrigeration systems or coolers.

In some cases, each system may include a client device configured to provide one or more control signals for controlling one or more building control components and/or devices of the building control system 12. For instance, in some cases, the HVAC system 20 may include an HVAC control device 22 used to communicate with and control one or more HVAC devices 24a, 24b, and 24c (collectively, 24) for servicing the HVAC needs of the building or structure 10. While the HVAC system 20 is illustrated as including three devices, it should be understood that the structure may include fewer than three or more than three devices 24, as desired. Some illustrative devices may include, but are not limited to a furnace, a heat pump, an electric heat pump, a geothermal heat pump, an electric heating unit, an air conditioning unit, a roof top unit, a humidifier, a dehumidifier, an air exchanger, an air cleaner, a damper, a valve, blowers, fans, motors, and/or the like. The HVAC system 20 may further include a system of ductwork and air vents (not explicitly shown). The HVAC system 20 may further include one or more sensors or devices 26 configured to measure parameters of the environment to be controlled. The HVAC system 20 may include more than one sensor or device of each type, as needed to control the system. It is contemplated that large buildings, such as, but not limited to an office building, may include a plurality of different sensors in each room or within certain types of rooms. The one or more sensors or devices 26 may include, but are not limited to, temperatures sensors, humidity sensors, carbon dioxide sensors, pressure sensors, occupancy sensors, proximity sensors, etc. Each of the sensor/devices 26 may be operatively connected to the control device 22 via a corresponding communications port (not explicitly shown). It is contemplated that the communications port may be wired and/or wireless. When the communications port is wireless, the communications port may include a wireless transceiver, and the control device 22 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

In some cases, the security system 30 may include a security control device 32 used to communicate with and control one or more security units 34 for monitoring the building or structure 10. The security system 30 may further include a number of sensors/devices 36a, 36b, 36c, 36d (collectively, 36). The sensor/devices 36 may be configured to detect threats within and/or around the building 10. In some cases, some of the sensor/devices 36 may be constructed to detect different threats. For example, some of the sensor/devices 36 may be limit switches located on doors and windows of the building 10, which are activated by entry of an intruder into the building 10 through the doors and windows. Other suitable security sensor/devices 36 may include fire, smoke, water, carbon monoxide, and/or natural gas detectors, to name a few. Still other suitable security system sensor/devices 36 may include motion sensors that detect motion of intruders in the building 10, noise sensors or microphones that detect the sound of breaking glass, security card pass systems, or electronic locks, etc. It is contemplated that the motion sensor may be a passive infrared (PIR) motion sensor, a microwave motion sensor, an ultrasonic motion sensor, a tomographic motion sensor, a video camera having motion detection software, a vibrational motion sensor, etc. In some cases, one or more of the sensor/devices 36 may include a video camera. In some cases, the sensor/devices 36 may include a horn or alarm, a damper actuator controller (e.g., that closes a damper during a fire event), a light controller for automatically turning on/off lights to simulate occupancy, and/or any other suitable device/sensor. These are just examples.

In some cases, the lighting system 40 may include a lighting control device 42 used to communicate with and control one or more light banks 44 having lighting units L1-L10 for servicing the building or structure 10. In some embodiments, one or more of the lighting units L1-L10 may be configured to provide visual illumination (e.g., in the visible spectrum) and one or more of the light units L1-L10 may be configured to provide ultraviolet (UV) light to provide irradiation. The lighting system 40 may include emergency lights, outlets, lighting, exterior lights, drapes, and general load switching, some of which are subject to "dimming" control which varies the amount of power delivered to the various building control devices. In some cases, the lighting system 40 may include motion sensors 46 or other sensors/devices for determining if an area is occupied.

In some cases, the fire system 50 may include a fire control device 52 used to communicate with and control one or more fire banks 54 having fire units F1-F6 for monitoring and servicing the building or structure 10. The fire system 50 may include smoke/heat sensors, a sprinkler system, warning lights, and so forth. In some cases, the access control system 60 may include an access control device 62 used to communicate with and control one or more access control units 64 for allowing access in, out, and/or around the building or structure 10. The access control system 60 may include doors, door locks, windows, window locks, turnstiles, parking gates, elevators, or other physical barriers, where granting access can be electronically controlled. In some embodiments, the access control system 60 may include one or more sensors 66 (e.g., RFID, etc.) configured to allow access to the building or certain parts of the building 10.

In a simplified example, the building control system 12 may be used to control a single HVAC system 20, a single security system 30, a single lighting system 40, a single fire system 50, and/or a single access control system 60. In other embodiments, the building control system 12 may be used to communicate with and control multiple discrete building control devices 22, 32, 42, 52, and 62 of multiple systems 20, 30, 40, 50, 60. The devices, units, and controllers of the systems 20, 30, 40, 50, 60 may be located in different zones and rooms, such as a common space area (a lobby, a break room, etc.), in a dedicated space (e.g., offices, work rooms, etc.) or outside of the building 10. In some cases, the systems 20, 30, 40, 50, 60 may be powered by line voltage, and may be powered by the same or different electrical circuit. It is contemplated that the building control system 12 may be used to control other suitable building control components that may be used to service the building or structure 10.

According to various embodiments, the building control system 12 may include a host device 70 that may be configured to communicate with the discrete systems 20, 30, 40, 50, 60 of the building control system 12. In some cases, the host device 70 may be configured with an application program that assigns devices of the discrete systems to a particular device (entity) class (e.g., common space device, dedicated space device, outdoor lighting, unitary controller, and so on). In some cases, there may be multiple hosts. For instance, in some examples, the host device 70 may be one or many of the control devices 22, 32, 42, 52, 62. In some cases, the host device 70 may be a hub located external to the building 10 at an external or remote server also referred to as "the cloud."

In some cases, the building control devices 22, 32, 42, 52, 62 may be configured to transmit a command signal to its corresponding building control component(s) for activating or deactivating the building control component(s) in a desired manner. In some cases, the building control devices 22, 32, 42, 52, 62 may be configured to receive a classification of the building control component and may transmit a corresponding command signal(s) to their respective building control component in consideration of the classification of the building control component.

In some instances, the building control devices 22, 32, 42, 62 may be configured to receive signals from one or more sensors 26, 36, 46, 66 located throughout the building or structure 10. In some cases, the building control devices 42 and 52 may be configured to receive signals from one or more sensors operatively and/or communicatively coupled with the lighting units L1-L10 and the fire units F1-F6 located throughout the building or structure 10, respectively. In some cases, the one or more sensors may be integrated with and form a part of one or more of their respective building control devices 22, 32, 42, 52, 62. In other cases, one or more sensors may be provided as separate components from the corresponding building control device. In still other instances, some sensors may be separate components of their corresponding building control devices while others may be integrated with their corresponding building control device. These are just some examples. The building control devices 22, 32, 42, 52, 62 and the host device 70 may be configured to use signal(s) received from the one or more sensors to operate or coordinate operation of the various building control system systems 20, 30, 40, 50, 60 located throughout the building or structure 10.

The one or more sensors 26, 36, 46, 66, L1-L10, and F1-F6 may be any one of a temperature sensor, a humidity sensor, an occupancy sensor, a pressure sensor, a flow sensor, a light sensor, a motion sensor, a video camera, a current sensor, a smoke sensor and/or any other suitable sensor. In one example, at least one of the sensors 26, 36, 46, 66, or other sensors, may be an occupancy sensor. The building control devices 22, 32, 42, 62 and/or the host device 70 may receive a signal from the occupancy sensor indicative of occupancy within a room or zone of the building or structure 10. In response, the building control devices 22, 32, 42, and/or 62 may send a command to activate one or more building control component(s) located in or servicing the room or zone where occupancy is sensed.

Likewise, in some cases, at least one of the sensors 26 may be a temperature sensor configured to send a signal indicative of the current temperature in a room or zone of the building or structure 10. The building control device 22 may receive the signal indicative of the current temperature from a temperature sensor 26. In response, the building control device 22 may send a command to an HVAC device 24 to activate and/or deactivate the HVAC device 24 that is in or is servicing that room or zone to regulate the temperature in accordance with a desired temperature set point.

In yet another example, one or more of the sensors may be a current sensor. The current sensor may be coupled to the one or more building control components and/or an electrical circuit providing electrical power to one or more building control components. The current sensors may be configured to send a signal to a corresponding building control device, which indicates an increase or decrease in electrical current associated with the operation of the building control component. This signal may be used to provide confirmation that a command transmitted by a building control device has been successfully received and acted upon by the building control component(s). These are just a few examples of the configuration of the building control system 12 and the communication that can take place between the sensors and the control devices.

In some cases, data received from the building control system 12 may be analyzed and used to dynamically (e.g., automatically) trigger or provide recommendations for service requests, work orders, changes operating parameters (e.g., set points, schedules, etc.) for the various devices 24, 34, 64, L1-L10, F1-F6 and/or sensors 26, 36, 46, 66 in the building control system 12. It is contemplated that data may be received from the control devices 22, 32, 42, 62, devices 24, 34, 64, L1-L10, F1-F6, and/or sensors 26, 36, 46, 66, as desired. In some cases, the data received from the building control system 12 may be combined with video data from image capturing devices. It is contemplated that the video data may be obtained from certain sensors 26, 36, 66 that are image capturing devices associated with discrete systems 20, 30, 60 of the building control system 12 or may be provided as separate image capturing devices such as video (or still-image) capturing cameras 80a, 80b (collectively 80), as desired. While the illustrative building 10 is shown as including two cameras 80, it is contemplated that the building may include fewer than two or more than two cameras, as desired. It is further contemplated that the cameras (either discrete cameras 80 or cameras associated with a discrete system 20, 30, 60) may be considered to be "smart" cameras (which may be an internet of things (IoT) device) which are capable of independently processing the image stream or "non-smart" cameras which are used as sensors to collect video information which is analyzed by an independent video analytics engine. Some illustrative "non-smart" cameras may include, but are not limited to, drones or thermovision cameras.

Figure 2:
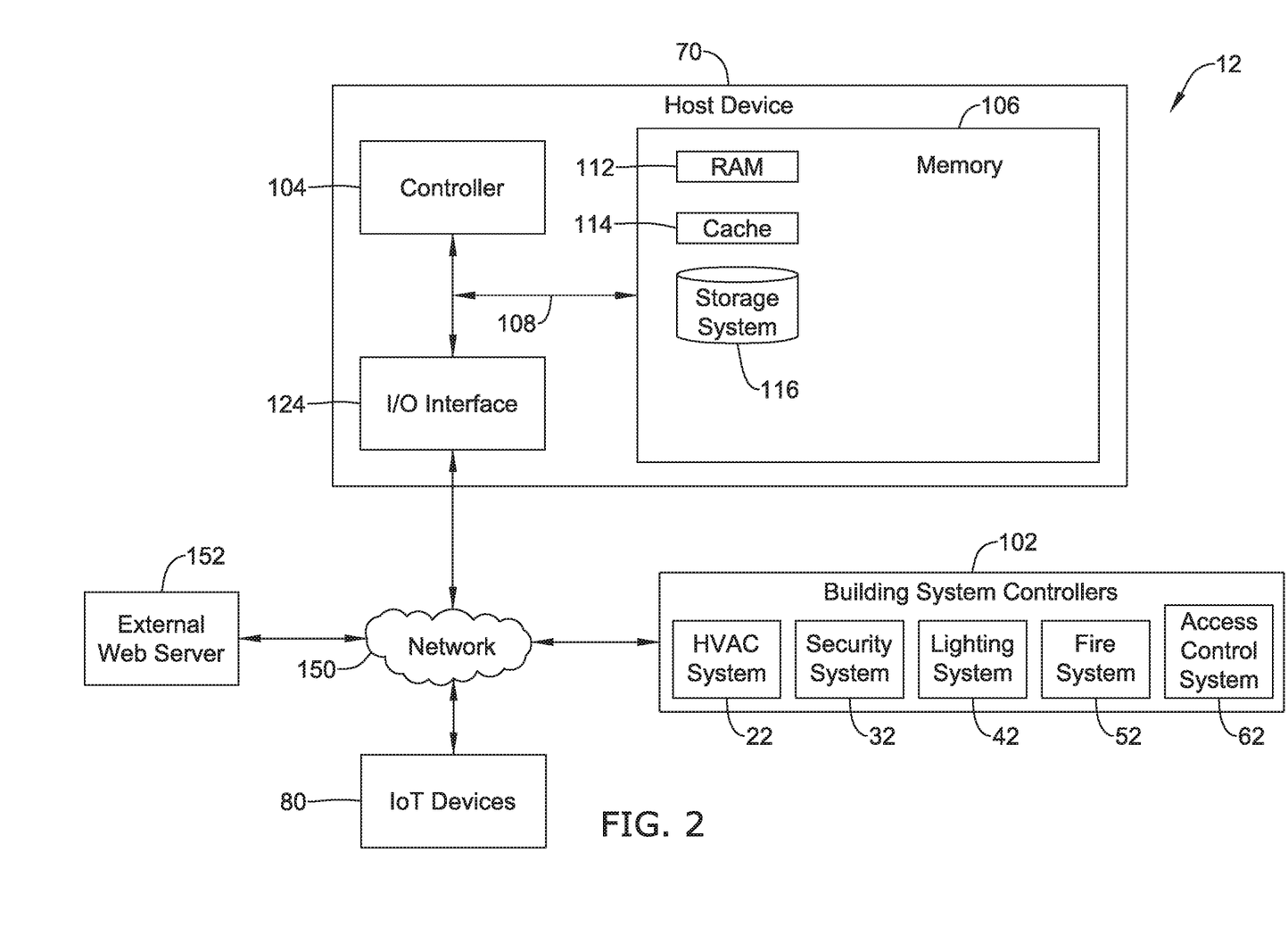
FIG. 2 is a schematic block diagram of the illustrative building control system of FIG. 1.

Referring to FIG. 2, which shows a schematic block diagram of the illustrative building control system 12 of FIG. 1, where the host device 70 can function as a server, a client, a local controller, or any other suitable device. In the example shown, the host device 70 can perform various communication and data transfer functions as described herein and can execute one or more application functions. The host device 70 can be any of a variety of computing devices, such as a server computer, a desktop computer, a handheld computer, a tablet computer, mobile telephone or other mobile device, and the like. The components of the host device 70 may include, but are not limited to, a controller 104, a system memory 106, and a bus 108 that couples various system components including the system memory 106 to the controller 104.

The controller 104 may include one or more controllers or processors that execute instructions stored in the system memory 106. The controller 104 may include a programmable microprocessor. Such a programmable microprocessor may allow a user to modify the control logic of the host device 70 even after it is installed in the field (e.g., firmware update, application update). When provided, the bus 108 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The system memory 106 of the host device 70 can include computer system readable media in the form of volatile memory, such as random access memory (RAM) 112 and/or cache memory 114. The host device 70 may further include other removable/non-removable, volatile/non-volatile computer system storage media. By way of example only, the storage system 116 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 108 by one or more data media interfaces.

The building system controllers 102 and/or IoT devices 80 may be connected to the host device 70 through any type of connection such as a network (e.g., network 150), including a local area network (LAN) or a wide area network (WAN), or the connection may be made to an external computer (for example, through the Internet using an Internet Service Provider). In various embodiments, the host device 70 may communicate with one or more devices from the various systems of the building system controllers 102 over the network 150. Such communication can occur via Input/Output (I/O) interface(s) 124. In some cases, the controller 104 of the host device 70 may be operatively coupled to I/O interface(s) 124 via the bus 108, and may use the I/O interface 124 to communicate with devices via the building system controllers 102.

In some cases, the control devices 22, 32, 42, 52, 62 and/or the host device 70 may be programmed to communicate over the network 150 with an external web service hosted by one or more external web servers 152. The control devices 22, 32, 42, 52, 62 and/or the host device 70 may be configured to upload selected data via the network 150 to the external web server 152 where it may be collected, stored, and/or analyzed on the external web server 152. Additionally, the control devices 22, 32, 42, 52, 62 and/or the host device 70 may be configured to receive and/or download selected data, settings, and/or services sometimes including software updates from the external web service over the network 150. The data, settings and/or services may be received automatically from the web service, downloaded periodically in accordance with a control algorithm, and/or downloaded in response to a user request.

Figure 3:
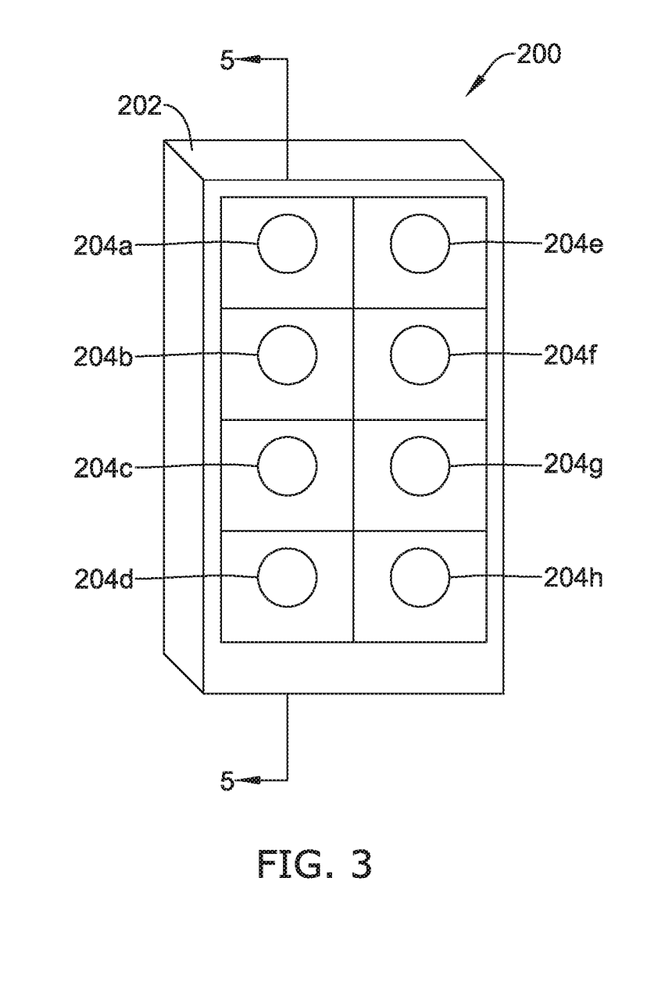
FIG. 3 is a schematic perspective view of an illustrative wall mountable universal backplane.
Figure 4:
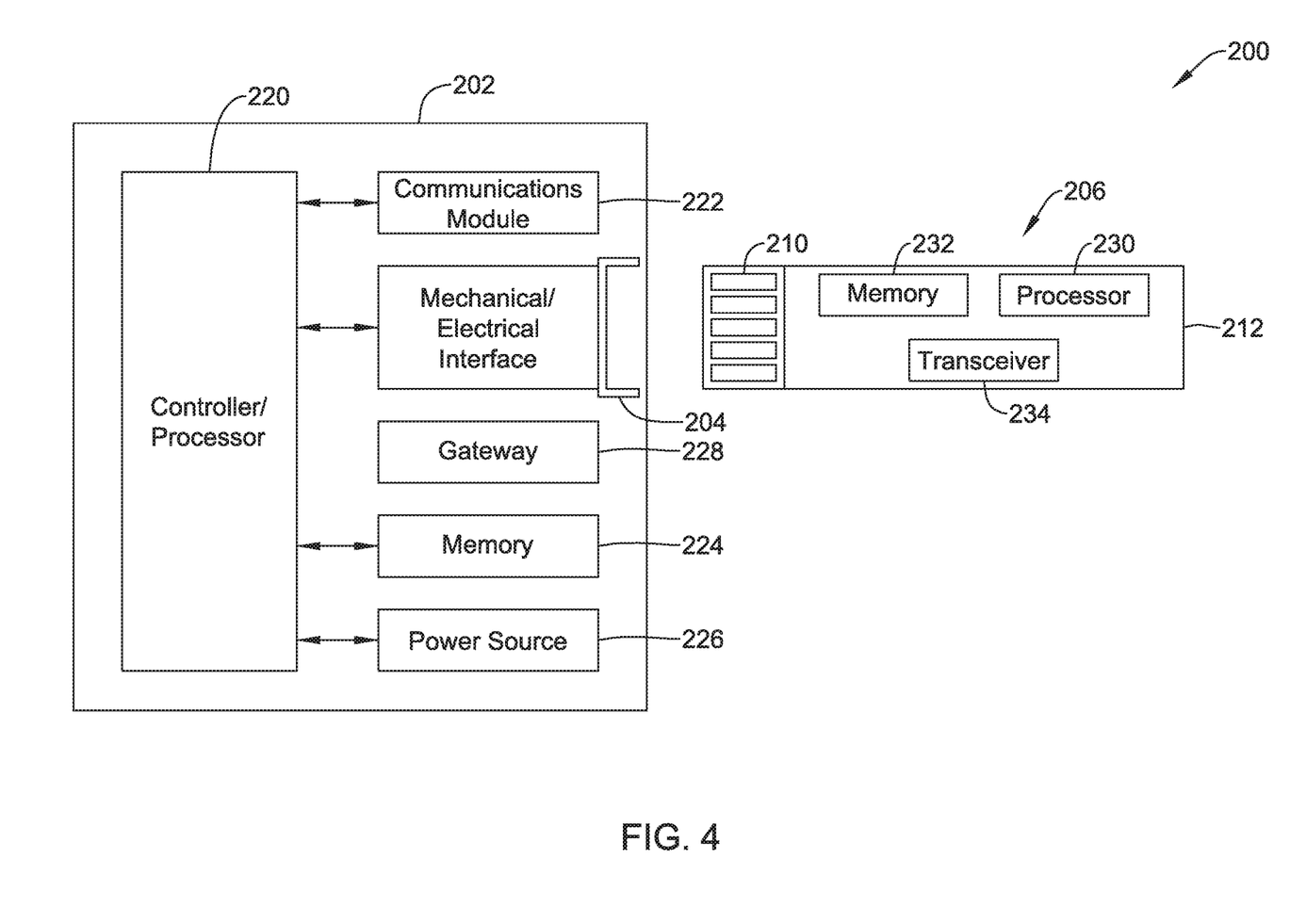
FIG. 4 is a schematic diagram of an illustrative backplane.

FIG. 3 is a schematic perspective view of an illustrative wall mountable universal backplane 200 for receiving sensors and/or edge devices 206 (see, for example, FIG. 4). Generally, the universal backplane 200 may provide an in-wall or on-wall (or ceiling) device with standardized socket-like interfaces that allow for compatible sensors and/or edge devices 206 to be plugged in and to get auto-enrolled into a corresponding building control system of the building. In some cases, the universal backplane 200 may be sized to fit into a standard 1-gang, 2-gang or 3-gang junction box, but this is just one example. The compatible sensors and/or edge devices 206 may be auto-discovered and auto-enrolled in the corresponding building control system. The universal backplane 200 may provide a single, unified way to add sensors and/or other devices to a building control system, with the ability to switch out and/or replace the sensors and/or other devices as desired.

Generally, the sensors or other devices may be building control sensors 206 and/or any other suitable sensor or device (e.g. IoT devices) as desired. Some illustrative building control sensors 206 may include but are not limited to, temperatures sensors, humidity sensors, carbon dioxide sensors, occupancy sensors, motion sensors, carbon monoxide sensors, fire sensors, smoke sensors, gas detectors, people counters, seismic sensors, video cameras or closed circuit television cameras (or other cameras including infrared), access card readers, intrusion sensors, microphones, odor detectors, public address speakers, light sensors, light level sensors and/or any of the sensors or devices described with respect to the building control system 12 of FIG. 1. In some cases, the building control sensors 206 can be provided by third party manufacturers, so long as they are compatible with the standardized socket-like interface of the universal backplane 200. The universal backplane 200 may allow a user, such as, but not limited to, a building owner, manager, supervisor, or other do-it-yourselfers, to add sensors or other devices 206 to a building control system 12, such as the building control system 12. In most cases, no service call will be required.

It is contemplated that the universal backplane 200 may be integrated into HVAC systems 20, security systems 30, lighting systems 40, fire systems 50, access control systems 60, and/or any other suitable system, as desired. In some cases, a universal backplane 200 may be configured to receive compatible building control sensors/devices 206 from more than one of these building control systems, and may auto-enroll the compatible building control sensors/ devices 206 with the appropriate building control system.

The universal backplane 200 may include a housing 202 that is configured to be mounted to a wall or ceiling. For example, while not explicitly shown, the housing 202 may include features for mounting the universal backplane 200 to a wall or ceiling. These features may include, but are not limited to apertures for receiving one or more screws or other mounting mechanism. In some cases, the housing 202 may be configured to be mounted to and/or within an electrical junction box, such as, a single-gang box. In some cases, the housing 202 may include AC or DC power terminals for receiving power to power the universal backplane 200. When the universal backplane 200 is mounted or installed, it may be necessary to provide an identity of the universal backplane 200 and a physical location to the building control system (e.g. to the host device 70 and/or control devices 22, 32, 42, 52, 62). In some cases, this may be done automatically by the control circuitry of the universal backplane 200, as will be described in more detail herein. Alternatively, or additionally, the location and/or identification of the universal backplane 200 can be manually entered into the building control system (e.g. into the host device 70 and/or control devices 22, 32, 42, 52, 62).

The universal backplane 200 may further include one or more universal sensor receiving bays 204*a-h*, collectively shown as 204. While FIG. 3 illustrates eight universal sensor receiving bays 204, the universal backplane 200 may include any number of universal sensor receiving bays 204, such as, but not limited to one, two, three, four, five, six, or more. The universal sensor receiving bays 204 may each include the same mechanical and electrical interface for receiving a compatible building control sensor/device 206*a-c* (see, for example, FIG. 4) such that the compatible building control sensor/device 206 may be positioned in or coupled with any available or unused universal sensor receiving bay 204. While the universal sensor receiving bays 204 are illustrated as having a generally circular shape, it is contemplated that the universal sensor receiving bays 204 may take any suitable shape as desired, such as but not limited to, square, rectangular, polygonal, etc. The universal sensor receiving bays 204 may provide a physical connection and an electrical connection between the universal backplane 200 and the compatible building control sensor/ device 206 while also supporting tolerance of runtime plug-in and pull-out of the compatible building control sensor/device 206 without damage to the universal sensor receiving bay(s) 204 and/or compatible building control sensor/device 206. For example, a user can remove a compatible building control sensor/device 206 at any time. The compatible building control sensor/device 206 can be replaced or upgraded at any time, as so desired.

FIG. 4 shows a schematic view of an illustrative universal backplane 200 and compatible building control sensor/ device 206. As can be seen, the universal backplane 200 may include a controller or processor (e.g. microprocessor, microcontroller, etc.) 220, a communications module 222, an internal memory 224, a power source 226, and in some cases a gateway 228. In some cases, the internal memory 224 may be part of the controller/processor 220. As described above, the housing 202 may include one or more universal sensor receiving bays 204.

Figure 5:
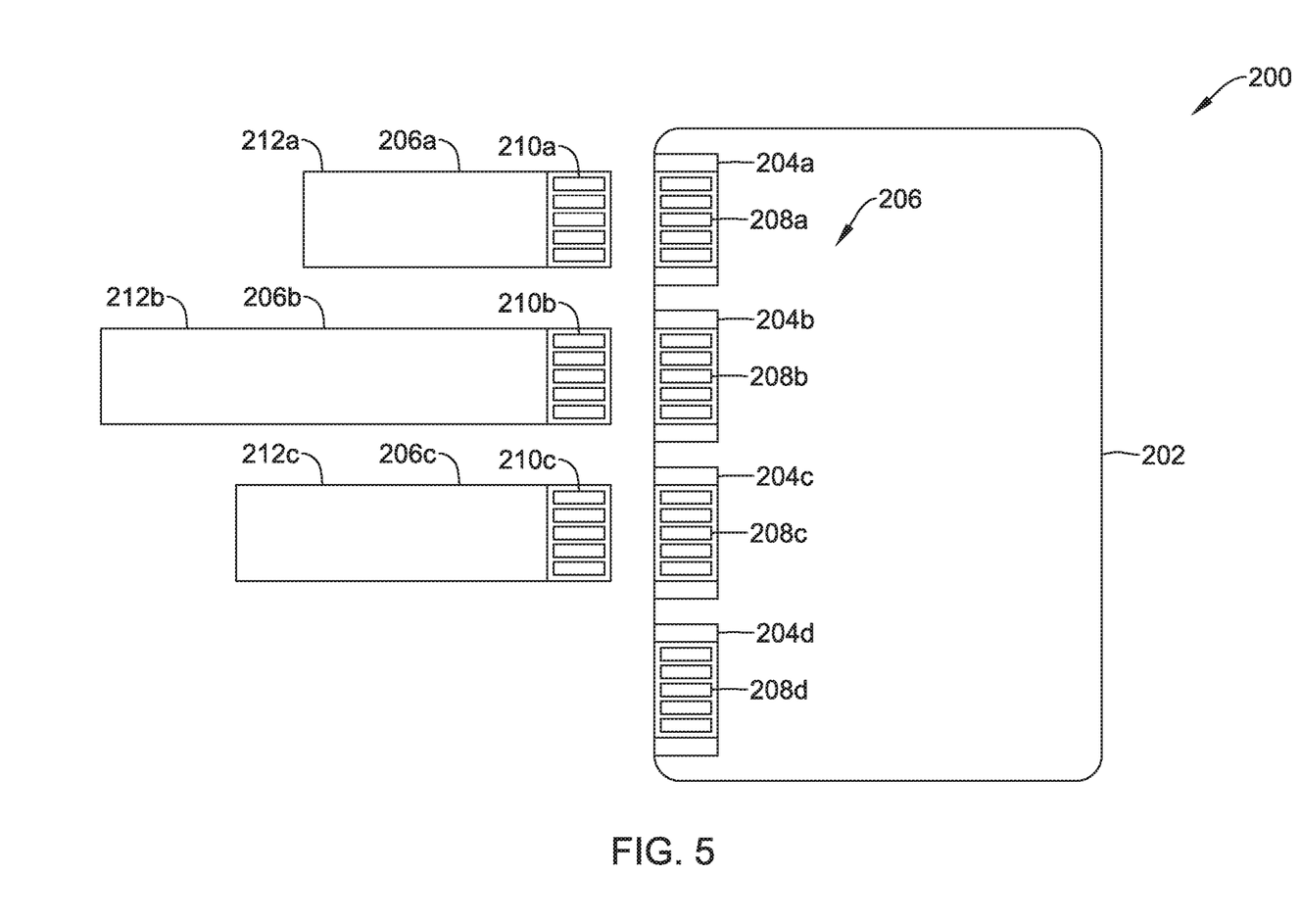
FIG. 5 is a cross-sectional view of the illustrative backplane of FIG. 3 taken along line 5-5.

FIG. 5 illustrates a schematic cross-section of the universal backplane 200 of FIG. 3 taken at line 5-5. Each universal sensor receiving bay 204 includes an mechanical and electrical interface 208*a-d* (collectively, 208) configured to interface with an electrical connector 210*a-c* (collectively, 210) on a compatible building control sensor/device 206 when the compatible building control sensor/device 206 is inserted into or mechanically seated in the universal sensor receiving bay 204. The electrical interface 210 of each of the plurality of the universal sensor receiving bays 204 may be operatively coupled with the controller/processor 220 (see FIG. 4) such that the connection between the electrical connectors 208, 210 of FIG. 5 may allow the universal backplane 200 to communicate with the compatible building control sensor/device 206. The controller/processor 220 (see FIG. 4) may be configured to automatically discover and enroll each compatible building control sensor/device 206 as it is plugged into a corresponding universal sensor receiving bay 204, as will be described in more detail herein.

Each compatible building control sensor/device 206 may have a housing 212*a-c* (collectively, 212) that is dimensioned to be removable and/or easily replaceable via the universal sensor receiving bays 204 of the universal backplane 200. In some cases, each compatible building control sensor/device 206 may include a male connector which is configured to be received within a female connector of the universal sensor receiving bay 204. In other cases, each compatible building control sensor/device 206 may include a female connector and the universal sensor receiving bays 204 may include a male connector. While each compatible building control sensor/device 206 may have a common mechanical interface and common electrical interface 210, not all of the compatible building control sensors/devices 206 need have the same length, size or other dimensions as illustrated in FIG. 5. For example, one of the compatible building control sensors/devices 206 may be a simple temperature sensor, while another one of the compatible building control sensors/devices 206 may be a security video camera. The overall size of the simple temperature sensor may be considerably smaller than the security video camera.

In FIG. 4, the communications module 222 of the universal backplane 200 may be operatively coupled to the processor/controller 220 and may be a wired network interface and/or a wireless network interface. When the communications module 222 is wireless, the communications module 222 may include a wireless transceiver, and the host device 70, other control devices 22, 32, 42, 52, 62 of the building control system 12, and/or other universal backplanes 100 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired. In some embodiments, the communications module 222 may be configured to form a node in a wireless mesh network. The communications module 222 to be capable of performing some processing, gathering information, and/or communicating with other connected nodes in the network (e.g., other backplanes 200, the host device 70, devices 22, 32, 42, 52, 62, and/or any other suitable device as desired).

In some cases, a wireless transceiver may be configured to broadcast a location beacon signal. This may allow the host device 70 and/or control devices 22, 32, 42, 52, 62 to determine a location of a particular universal backplane 200 in a building 10 by triangulation or other technique. In some cases, it is desirable for the building control system (e.g. host device 70 and/or control devices 22, 32, 42, 52, 62) to know the location of the universal backplane 200 in order to identify the source location of the collected sensor data to properly adjust the various systems of the building control system 12. In some cases, the universal backplane 200 may include an internet gateway or other device 228 that may allow the universal backplane 200 to communicate over a wide area network (WAN) such as, for example, the Internet. In some cases, the universal backplane 200 may communicate with the host device 70 and/or control devices 22, 32, 42, 52, 62 via the gateway 228.

The memory 224 of the universal backplane 200 may be in communication with the controller/processor 220. The memory 224 may be used to store any desired information, such as, but not limited to, machine instructions for what information to send to a host device 70 and/or other control devices 22, 32, 42, 52, 62. The memory 224 may be any suitable type of storage device including, but not limited to, RAM, ROM, EPROM, flash memory, a hard drive, and/or the like. In some cases, the controller/processor 220 may store information within the memory 224, and may subsequently retrieve the stored information from the memory 224.

The universal backplane 200 may include a power source 226 configured to at least partially power the universal backplane 200. In some cases, the power source 226 may be capacitor or a rechargeable battery. In other cases, the power source 226 may be a non-rechargeable battery. In yet other embodiments, the universal backplane 200 may be configured to be hard wired into a building's electrical system or plugged into an electrical outlet. In some cases, the power source 226 may include power over Ethernet (POE) capabilities. In some cases, if POE is utilized and the POE point is mapped with location details, the location of the universal backplane 200 can be automatically determined as corresponding to the known location of the POE point. In addition, the universal backplane 200 may include a back-up source of energy such as, for example, a battery that may be used to supplement power supplied to the universal backplane 200 when the amount of available power stored by or available from the power source 226 is less than optimal or is insufficient to power the universal backplane under certain conditions. In some embodiments, the power source 226 may provide power to the compatible building control sensors/devices 206 that are seated in one of the universal sensor receiving bays 204.

In some cases, a compatible building control sensor/device 206 may include a processor/controller 230, a memory 232, and a transceiver 234. The memory 232 of the compatible building control sensor/device 206 may be in communication with the processor 230. The memory 232 may be used to store any desired information, such as, but not limited to, unique device identification information (Device ID) to provide to the universal backplane 200, a unique function identification (Function ID) to provide to the universal backplane 200, and/or data obtained from the compatible building control sensor/device 206. The memory 232 may be any suitable type of storage device including, but not limited to, RAM, ROM, EPROM, flash memory, a hard drive, and/or the like. In some cases, the processor 130 of the compatible building control sensor/device 206 may store information within the memory 232, and may subsequently retrieve the stored information from the memory 232.

The transceiver 134 may control communication between the compatible building control sensor/device 206 (e.g. the processor 220) and the universal backplane 200 over the common electrical interface 210 of the universal sensor receiving bay 204. In some cases, the transceiver 134 may also include a wireless transceiver that is compatible with one or more wireless communication protocols such as, for example, cellular communication, RF6, ZigBee, Bluetooth, Bluetooth® low energy (BLE), Wi-Fi, IrDA, dedicated short range communication (DSRC), EnOcean, or any other suitable wireless protocols, as desired. This may allow the compatible building control sensor/device 206 to receive information, such as, but not limited to firmware updates from a remote source such as a smartphone, a tablet computer, a laptop computer, a desktop computer and/or other device that is in operative communication with the processor/controller 230 via the wireless transceiver 234.

Figure 6:
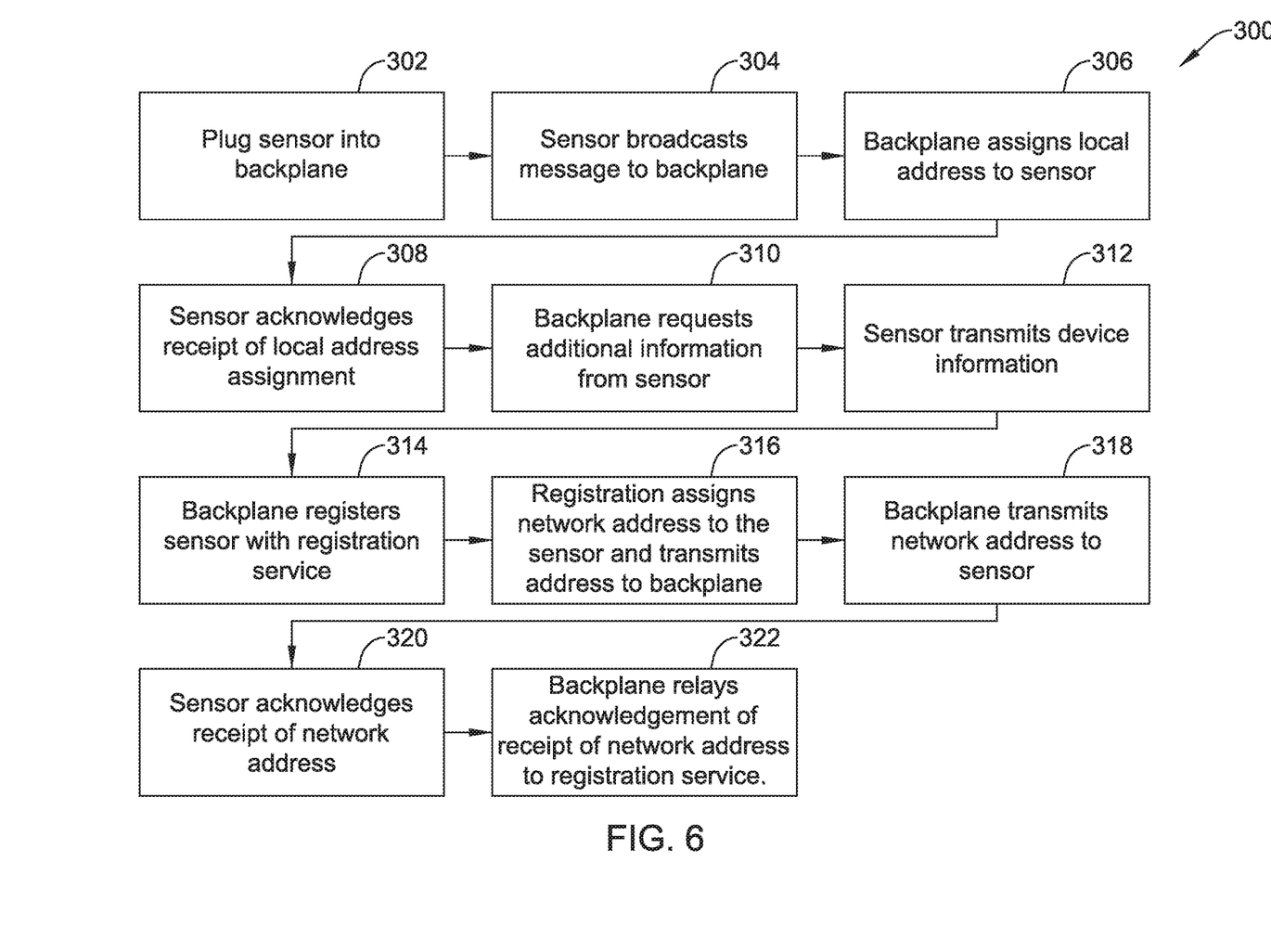
FIG. 6 is a flow chart of an illustrative method for installing a sensor in the illustrative universal backplane of FIG. 3.

FIG. 6 is a flow chart of an illustrative method for installing a compatible building control sensor/device 206 in the illustrative universal backplane of FIG. 3. The universal backplane 200 may interact with the compatible building control sensor/device 206 and automatically discover and enroll the compatible building control sensor/device 206 when plugged into one of the universal sensor receiving bays 204 of the universal backplane 200. Each step may be under taken without user intervention and as such is considered as occurring automatically. In some cases, a compatible building control sensor/device 206 may be automatically discovered by the processor/controller 220 of the universal backplane 200 and automatically enrolled into the building control system 12 without any user action or input (beyond the insertion of the compatible building control sensor/device 206 into one of the universal sensor receiving bays 204 of the universal backplane 200). The processor/controller 220 of the universal backplane 200 and/or the compatible building control sensor/device 206 may each include a plurality of data and operational steps organized into software layers such that when a compatible building control sensor/device 206 is received in a universal sensor receiving bays 204, the compatible building control sensor/device 206 is automatically recognized by the universal backplane 200.

In one example, when a compatible building control sensor/device 206 is plugged into or otherwise disposed within a universal sensor receiving bay 204 of the universal backplane 200, as shown at block 302, the compatible building control sensor/device 206 may introduce itself by sending a signal or broadcast a message (e.g., via the controller 230/transceiver 234) to the processor/controller 220. The signal or message may include a device ID, as shown at block 304. The device ID may include a type of device, a type of data that the device collects, etc. Once the processor/controller 220 of the universal backplane 200 has received the device identification, the processor/controller 220 of the universal backplane 200 may assign a local address to the universal sensor receiving bays 204 and transmit the address to the compatible building control sensor/device 206, as shown at block 306. The compatible building control sensor/device 206 may then store the local address in the memory 232 and transmit a return message that acknowledges the receipt of the local address to the processor/controller 220 of the universal backplane 200, as shown at block 308. The processor/controller 220 of the universal backplane 200 may then query the compatible building control sensor/device 206 for additional information, such as device type, available functions, etc., as shown at block 310. If not already provided, the processor/controller 230 of the compatible building control sensor/device 206 may be configured to transmit a device ID and/or one or more Function IDs to the universal backplane 200, as shown at block 312. Each compatible building control sensor/device 206 may have one or more functions that each perform a specific action and/or sensing operation. Each function may have its own unique function ID. For example, the auto-discovery of a newly added compatible building control sensor/device 206 may be implemented through an "auto discovery" function of the compatible building control sensor/device 206. Another function ID may identify a type of data being collected, such as temperature, motion, video, humidity, etc. In some cases, a function of one compatible building control sensor/device 206 may be invoked by a different function of itself (e.g., the compatible building control sensor/device 206) and/or another compatible building control sensor/device 206. For example, one function of a compatible building control sensor/device 206 may include sensing motion in a field of view while another function of the same compatible building control sensor/device 206 (or a different compatible building control sensor) may include capturing video of the field of view. When the first function senses motion in the field of view, the first function may invoke the second function to capture video of the field of view. This is just one example.

Once the processor/controller 220 of the universal backplane 200 has received the device ID and/or one or more function IDs, the controller 220 may transmit and register the compatible building control sensor/device 206 with a local registration service (e.g., the building control system 12 including, but not limited to, the host device 70 or other controller) or a remote registration service (e.g., a cloud based server), as shown at block 314. This may include transmitting the device ID, the one or more available functions (e.g., function IDs), and/or the local network address to host device 70 and/or control devices 22, 32, 42, 52, 62. The processor/controller 220 of the universal backplane 200 may also transmit a location identifier to the building control system 12. The location identifier may identify a physical location of the universal backplane 200 within the building 10. This may aid the building control system 12 to correlate the data received from the compatible building control sensor/device 206 with a particular part of the building. In some cases, the universal backplane 200 may utilize the gateway 228 to communicate with the building control system 12. In some cases, the registration service may provide a confirmation of the newly added compatible building control sensor/device 206 and return a network address assignment for the compatible building control sensor/device 206 to the universal backplane 200, as shown at block 316. The universal backplane 200 may transmit the network address assignment to the compatible building control sensor/device 206, as shown at block 318. The compatible building control sensor/device 206 may provide an acknowledgement of receipt to the universal backplane 200, as shown at block 320, which in turn may provide an acknowledgment to the registration service, as shown at block 322. This process 300 may be repeated each time a new compatible building control sensor/device 206 is connected to the universal backplane 200.

Figure 7:
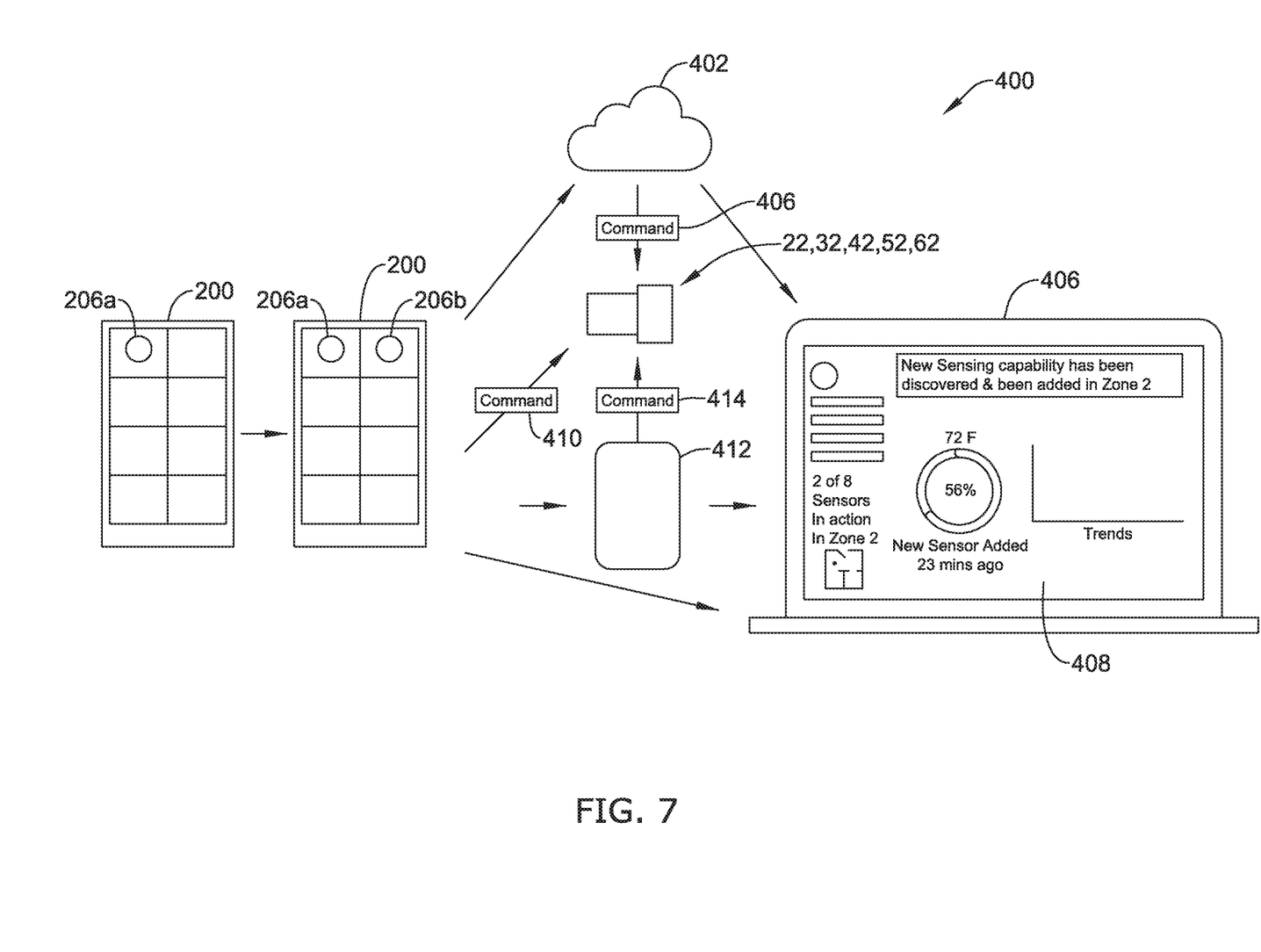
FIG. 7 is a schematic diagram of the illustrative backplane incorporated into a building control system.

The operation of the universal backplane 200 will now be described in more detail with respect to FIG. 7, which is a schematic diagram 400 of an illustrative universal backplane 200 incorporated into a building control system 12. For clarity, not all of the components of the building control system 12 are illustrated in FIG. 7. In the illustrated embodiments, the universal backplane 200 initially includes a single building control sensor/device 206a, which may be a temperature sensor. However, it should be understood that the universal backplane 200 may include less than one or more than one compatible building control sensor/device 206. A user then plugs in a second building control sensor/device 206b, which in the example shown may be a humidity sensor. The universal backplane 200 and the compatible building control sensor 206b may then automatically undertake the steps outlined with respect to FIG. 6. Once the compatible building control sensor 206b is registered, the building control system 12 may recognize and utilize data gathered by the compatible building control sensor 206b to help operate the building control system 12. It is contemplated that the information gathered or obtained by the compatible building control sensor/device 206 may be utilized in a number of different manners.

In a first example, the universal backplane 200 may transmit data from the compatible building control sensor/device 206 to an external server or processing system 402. The external server(s) 402 may be a suite of hardware and software which may sometimes be referred to as "the cloud." In some cases, the host device 70 and/or control devices 22, 32, 42, 52, 62 may be a part of the external server 402. The external server 402 may analyze the data from the compatible building control sensor/device 206 (and/or other sensors or devices). It is contemplated that the external server 402 may compare data to control set points (e.g., a current room temperature to a temperature set point) or may perform more advanced analytics. For example, the external server 402 may determine that an area of the building is unoccupied and then adjust the temperature set point for that area of the building to conserve energy. In some cases, the external server 402 may provide control commands 404 directly to the building control devices 22, 32, 42, 52, and 62 and/or components thereof. It is further contemplated that a user may monitor and/or control the building control system 12 via a remote device 406. The remote device 406 may be a desktop computer, a laptop, a tablet, a smart phone, a wearable device, etc. The remote device 406 may be configured to use wired or wireless protocols to communicate with the external server 402. Some illustrative wireless communication protocols may include, but are not limited to, cellular communication, ZigBee, REDLINK™, Bluetooth, WiFi, IrDA, dedicated short range communication (DSRC), EnOcean, and/or any other suitable common or proprietary wireless protocol, as desired.

The remote device 406 may include a display 408 that is configured to display information regarding the building control system 12. In some cases, the remote server 402 can issue an alert to a user via the remote device 406 indicating that a new compatible building control sensor/device 206b has been added (e.g. inserted into another one of the universal sensor receiving bays of the universal backplane 200). Other information regarding the building control system 12, the universal backplane 200, and/or the compatible building control sensors/devices 206 may also be accessed, including, but not limited to, sensor readings, trends, a timeline of sensor installations, control programs, etc. It is contemplated that operating information can be provided automatically from the external server 402 or upon user request.

Additionally, or alternatively to cloud based analytics, the controller 220 of the universal backplane 200 may be configured to analyze the data obtained from the compatible building control sensors/devices 206 and communicate with remote devices that may include the remote device 406, another universal backplane 200, and/or the building control system 12. In some embodiments, the controller 220 of the universal backplane 200 may transmit control signals 410 directly to the building control devices 22, 32, 42, 52, and 62 and/or components thereof based on the data received from one or more of the compatible building control sensors/devices 206. In some cases, the processor/controller 220 may transit one or more control commands 410 to one or more building control devices, host device 70 and/or control devices 22, 32, 42, 52, 62 of the building control system 12 in response to a sensor reading from one of the compatible building control sensor/device 206 crossing a predetermined threshold. For example, the universal backplane 200 may issue a command to an actuator to open a damper to change a flow of air based on a temperature reading. In this example, the universal backplane 200 may perform a thermostat function.

The universal backplane 200 may utilize data from a single compatible building control sensor/device 206 or may fuse data from two or more compatible building control sensors/devices 206. For example, if a motion sensor detects motion and a light sensor detects light when neither are expected, the universal backplane 200 may fuse the data to determine that workers are present in the building and may send control instructions to adjust the HVAC system 20 accordingly. This is just one example. In some cases, the universal backplane 200 may communicate with other similar universal backplanes (e.g., peer to peer communication) within the building control system 12. For example, two or more universal backplanes 200 may communicate and collaborate to analyze data from the compatible building control sensors/devices 206 and make control decisions. It is further contemplated that the universal backplane 200 may be configured to transmit data directly to the remote device 406 (e.g., sometimes via the gateway 228), to another wall mountable universal backplane 200, and/or to the host device 70 and/or control devices 22, 32, 42, 52, 62. It is contemplated that the processor/controller 220 of the universal backplane 200 may be configured to process the data received from one or more compatible building control sensors/devices 206 prior to transmitting the data to the remote device 406, to another wall mountable universal backplane 200, and/or to the host device 70 and/or control devices 22, 32, 42, 52, 62. In other embodiments, the processor/controller 220 of the universal backplane 200 may be configured to transmit raw or unprocessed data to the remote device 406, to another wall mountable universal backplane 200, and/or to the host device 70 and/or control devices 22, 32, 42, 52, 62.

It is further contemplated that the universal backplane 200 may transmit data from the compatible building control sensors/devices 206 to an external gateway 412. The external gateway 412 may be configured to analyze the data obtained from the compatible building control sensors/devices 206 and to transmit control signals 414 to the building control devices 22, 32, 42, 52, and 62 and/or components thereof. The external gateway 412 may also communicate sensor data to the remote device 406.

The processor/controller 220 of the universal backplane 200 may be capable of learning from the data received from the various compatible building control sensors/devices 206 (indicative of the environment and the people utilizing the environment). In some cases, the universal backplane 200 may recommend that particular compatible building control sensors/devices 206 be added for gathering additional information. For example, if a motion sensor detects a lot of movements over a period of time, the processor/controller 220 may recommend that a compatible building control sensor/device 206 that includes a closed circuit television camera function be added to improve security monitoring. This is just one example and not intended to be limiting. It is contemplated that the recommendation for the addition of a particular compatible building control sensor/device 206 to one of the universal sensor receiving bays 204 may be transmitted to the remote device 406, the building control system 12, the host device 70 and/or control devices 22, 32, 42, 52, 62, etc.

It is contemplated that the building control sensors 206 and universal backplane 200 may be utilized in a number of different manners within a building 10. Some illustrative scenarios are provided as some illustrative use cases for the universal backplane 200 and the compatible building control sensors/devices 206; however these scenarios are not intended to be limiting. Further it should be understood that the control commands and/or alerts may be issued directly from the universal backplane 200, from an external server 402 and/or from a gateway 412.

1. A temperature sensor senses the temperature in an area as too hot or cold and triggers the HVAC system (e.g., furnace, air conditioner, blower, damper actuator, etc.).
2. An occupancy sensor detects people are present and the universal backplane 200 turns on lights and regulates temperature via the HVAC system.
3. A people count sensor detects more people traffic over a period of time and suggests adding a CCTV camera (e.g., the universal backplane 200 may be self-learning)
4. Occupancy sensors can cooperate to detect if there are any guests still in room (e.g., a hotel room) and the universal backplane 200 can control the HVAC system accordingly.
5. The universal backplane 200 can learn the pattern of occupancy in conference room or office and predict/optimize environment conditions accordingly.
6. Odor sensors registering an odor may trigger an air return valve to be opened.
7. A light sensor may sense ambient light from external sources triggering the automatic adjustment of lighting levels.
8. The universal backplane 200 may be configured to sense required light in the space based on the activity; if a user overrules the universal backplane's 200 lighting scheme, the universal backplane 200 learns from the user adjustments.
9. A motions sensor and/or an access reader can senses presence and identification of a person triggering the control of light intensity based on a particular user's preferences.

10. A people counter may determine a number of people present and trigger the adjustment of comfort levels of HVAC system based on the people count before it gets warm.
11. A motion sensor may detect occupant's behaviour patterns and movements (e.gl, lots of people leaving the office space for lunch) and trigger the optimization of elevator systems and place them in required floors.
12. The building control sensors 206 and the universal backplane 200 may be used to detect an activity type of occupants (discussions, meetings, reading, dining, etc.), analyse usage patterns, and provide insights for improvements.
13. The compatible building control sensors/devices 206 and the universal backplane 200 may be used to sense activity patterns and the demands of the activity to provide recommendations to repurpose or better utilize the space.
14. The compatible building control sensors/devices 206 and the universal backplane 200 may be used to sense asset movement from a zone and trigger an update of the location of the asset.
15. The compatible building control sensors/devices 206 and the universal backplane 200 may be configured to sense emergency situations of occupants (e.g., a heart attack, slip and fall, etc.) and to alert a facility manager.
16. The compatible building control sensors/devices 206 and the universal backplane 200 may be configured sense harmful virus/bacteria spread and provide an alert in real time.
17. The compatible building control sensors/devices 206 and the universal backplane 200 may be configured to sense occupants postures, physical working style and to suggest corrective measures to improve overall health.
18. The compatible building control sensors/devices 206 and the universal backplane 200 may be configured to sense unhygienic conditions (garbage that has not been removed, rodents etc.) and to provide alerts.

Example compatible building control sensors/devices 206 may include proximity sensors, motion sensors, limit switches, noise sensors or microphones, video cameras, still image cameras, a horn or alarm, fire, smoke, water, carbon monoxide, and/or natural gas detectors, a damper actuator controller (e.g. that closes a damper during a fire event), connection or disconnection of a device to a network, activation and/or deactivation of IoT devices, passcode entry, a light controller, smart light bulbs, home appliances such as, but not limited to, robotic vacuums, coffee pots, etc., water heaters, voice activated smart speakers (e.g., AMAZON ECHO™ or GOOGLE HOME™), WiFi enabled power outlets, garage door openers, door locks, televisions, speakers, doorbells, water valves, video cameras, wearable devices, radiofrequency receivers, thermal imagers, radar devices, lidar devices, ultrasound devices, etc.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A wall mountable universal backplane for accepting a plurality of building control sensors, the wall mountable universal backplane comprising:
   a housing configured to be secured relative to a wall of a building;
   a plurality of universal sensor receiving bays each including the same mechanical and electrical interface for selectively receiving one of a plurality of compatible building control sensors, wherein each of the plurality of compatible building control sensors include a mechanical and electrical interface that is compatible with the mechanical and electrical interface of the universal sensor receiving bays;
   a controller operatively coupled to the electrical interface of each of the plurality of universal sensor receiving bays, the controller configured to automatically discover each of the compatible building control sensors, if any, received by the plurality of universal sensor receiving bays; and
   a communication module operatively coupled to the controller for communicating with a building control system, wherein the controller is configured to transmit one or more control commands for controlling one or more building control devices of the building control system in response to one or more sensor readings from one or more of the compatible building control sensors meeting predetermined criteria.

2. The wall mountable universal backplane of claim 1, wherein automatically discovering each of the compatible building control sensors that are received by the plurality of universal sensor receiving bays comprises automatically identifying one or more functions of each of the compatible building control sensors that are received by the plurality of universal sensor receiving bays.

3. The wall mountable universal backplane of claim 2, wherein automatically identifying one or more functions provided by the compatible building control sensors that are received by the plurality of universal sensor receiving bays comprises the controller receiving one or more Function IDs from each of the compatible building control sensors that define the one or more functions of the corresponding compatible building control sensor.

4. The wall mountable universal backplane of claim 2, wherein automatically discovering each of the compatible building control sensors that are received by the plurality of universal sensor receiving bays comprises the controller receiving a Device ID from each of the compatible building control sensors that are received by the plurality of universal sensor receiving bays.

5. The wall mountable universal backplane of claim 2, wherein automatically discovering each of the compatible building control sensors that are received by the plurality of universal sensor receiving bays further comprises the controller assigning a local address to each of the compatible building control sensors and communicating the local address to the corresponding compatible building control sensor.

6. The wall mountable universal backplane of claim 2, wherein automatically discovering each of the compatible building control sensors that are received by the plurality of universal sensor receiving bays further comprises the controller registering each of the compatible building control sensors with the building control system, including identifying one or more functions of each of the compatible building control sensors to the building control system.

7. The wall mountable universal backplane of claim 1, wherein the communication module comprises a wireless network interface.

8. The wall mountable universal backplane of claim 1, wherein the communication module is configured to form a node in a wireless mesh network.

9. The wall mountable universal backplane of claim 1, wherein the communication module comprises a wired network interface.

10. The wall mountable universal backplane of claim 1, wherein the communication module is configured to communicate with one or more other wall mountable universal backplanes.

11. The wall mountable universal backplane of claim 1, wherein the controller is configured to process data received from one or more of the compatible building control sensors that are received by the plurality of universal sensor receiving bays, and transmit a result to a remote device.

12. The wall mountable universal backplane of claim 11, wherein the remote device comprises one or more of another wall mountable universal backplane and/or the building control system.

13. The wall mountable universal backplane of claim 1, wherein the controller is configured to transmit one or more control commands to one or more building control devices of the building control system in response to a sensor reading from one of the compatible building control sensors crossing a predetermined threshold.

14. The wall mountable universal backplane of claim 1, wherein the controller is configured to provide a location identifier to the building control system, wherein the location identifier identifies a physical location of the wall mountable universal backplane within the building.

15. The wall mountable universal backplane of claim 1, wherein the controller is configured to determine and transmit a recommendation to a remote device for the addition of a particular compatible building control sensor to one of the plurality of universal sensor receiving bays.

16. A wall mountable universal backplane for accepting a plurality of building control sensors, the wall mountable universal backplane comprising:
 a housing configured to be secured relative to a wall of a building;
 a plurality of universal sensor receiving bays each including the same mechanical and electrical interface for selectively receiving a compatible building control sensor, wherein the compatible building control sensors include a mechanical and electrical interface that is compatible with the mechanical and electrical interface of each of the universal sensor receiving bays;
 a controller operatively coupled to the electrical interface of each of the plurality of universal sensor receiving bays, the controller configured to automatically discover each of the compatible building control sensors that are received by the plurality of universal sensor receiving bays; and
 a communication module operatively coupled to the controller for notifying a remote building controller of each of the compatible building control sensors that are received by the plurality of universal sensor receiving bays and discovered by the controller.

17. The wall mountable universal backplane of claim 1, wherein the compatible building control sensors comprise one or more of a temperature sensor, a humidity sensor, a Carbon Dioxide sensor, a Carbon Monoxide sensor, a gas sensor, a smoke sensor, a fire sensor, a video camera, an access card reader, an intrusion sensor, a microphone, a light level sensor, a motion sensor, and an occupancy sensor.

18. The wall mountable universal backplane of claim 1, wherein each of the compatible building control sensors store one or more Function ID's that define the one or more functions of the corresponding compatible building control sensor, and wherein the one or more Function ID's are shared with the controller of the wall mountable universal backplane when the compatible building control sensor is received by one of the plurality of universal sensor receiving bays and discovered by the controller.

19. A wall mountable universal backplane for accepting a plurality of building control sensors, the wall mountable universal backplane comprising:
 a housing configured to be secured relative to a wall of a building;
 a plurality of universal sensor receiving bays each including the same mechanical and electrical interface for selectively receiving a compatible building control sensor;
 a communication module;
 a controller operatively coupled to the communication module and the electrical interface of each of the plurality of universal sensor receiving bays;
 a compatible building control sensor received by one of the plurality of universal sensor receiving bays, wherein the compatible building control sensor includes a mechanical and electrical interface that is compatible with the mechanical and electrical interface of the universal sensor receiving bays; and
 wherein the controller is configured to register the compatible building control sensor with a remote building controller via the communication module.

20. The wall mountable universal backplane of claim 19, wherein the compatible building control sensor stores one or more Function ID's that define one or more functions of the compatible building control sensor, and wherein the one or more Function ID's are shared with the controller when the compatible building control sensor is received by one of the plurality of universal sensor receiving bays.

* * * * *